United States Patent
Gelez et al.

(10) Patent No.: US 8,116,964 B2
(45) Date of Patent: Feb. 14, 2012

(54) METHOD FOR THE INDIVIDUAL CONTROL OF A SET OF VALVE ACTUATORS BY THE ECU

(75) Inventors: Nicolas Gelez, Le Pecq (FR); Boris Bouchez, Saint Germain en Laye (FR); Ronan Danioux, Cergy (FR)

(73) Assignee: Valeo Systemes de Controle Moteur, Cergy Pomtoise Cedex (FR)

( * ) Notice: Subject to any disclaimer, the term of this patent is extended or adjusted under 35 U.S.C. 154(b) by 496 days.

(21) Appl. No.: 12/441,850

(22) PCT Filed: Sep. 25, 2007

(86) PCT No.: PCT/FR2007/001558
§ 371 (c)(1),
(2), (4) Date: Mar. 18, 2009

(87) PCT Pub. No.: WO2008/037889
PCT Pub. Date: Apr. 3, 2008

(65) Prior Publication Data
US 2009/0276146 A1    Nov. 5, 2009

(30) Foreign Application Priority Data
Sep. 25, 2006    (FR) .................................... 06 08374

(51) Int. Cl.
*F02D 43/00*    (2006.01)
*F01L 1/34*    (2006.01)
*F01L 9/04*    (2006.01)

(52) U.S. Cl. ..................................... 701/105; 123/90.11
(58) Field of Classification Search .................. 701/105, 701/102, 115; 123/90.11, 90.15, 90.17
See application file for complete search history.

(56) References Cited

U.S. PATENT DOCUMENTS

| 6,278,932 B1 | 8/2001 | Baeumel et al. |
| 6,435,147 B1* | 8/2002 | Eichenseher et al. ...... 123/90.11 |
| 2002/0059908 A1 | 5/2002 | Eichenseher et al. |
| 2007/0239325 A1* | 10/2007 | Regunath ........................ 701/3 |

FOREIGN PATENT DOCUMENTS

| FR | 2 616 481 A | 12/1998 |
| JP | 2002 221012 A | 8/2002 |

OTHER PUBLICATIONS

International Search Report from PCT/FR2007/001558 dated Mar. 14, 2008 (2 pages).

* cited by examiner

*Primary Examiner* — Hieu T Vo
(74) *Attorney, Agent, or Firm* — Osha • Liang LLP

(57) ABSTRACT

The invention relates to a system for controlling a thermal engine with valves, that comprises an engine control unit (1) and a plurality of valve actuators (3), wherein the engine control unit is connected to a communication bus (2) and the actuators are distributed into at least two sets each comprising a connection interface (4) to the communication bus, the engine control unit being designed so as to define actuator driving instructions and to transmit into the bus and for each set an individualised frame including the driving instructions for the related set.

4 Claims, 1 Drawing Sheet

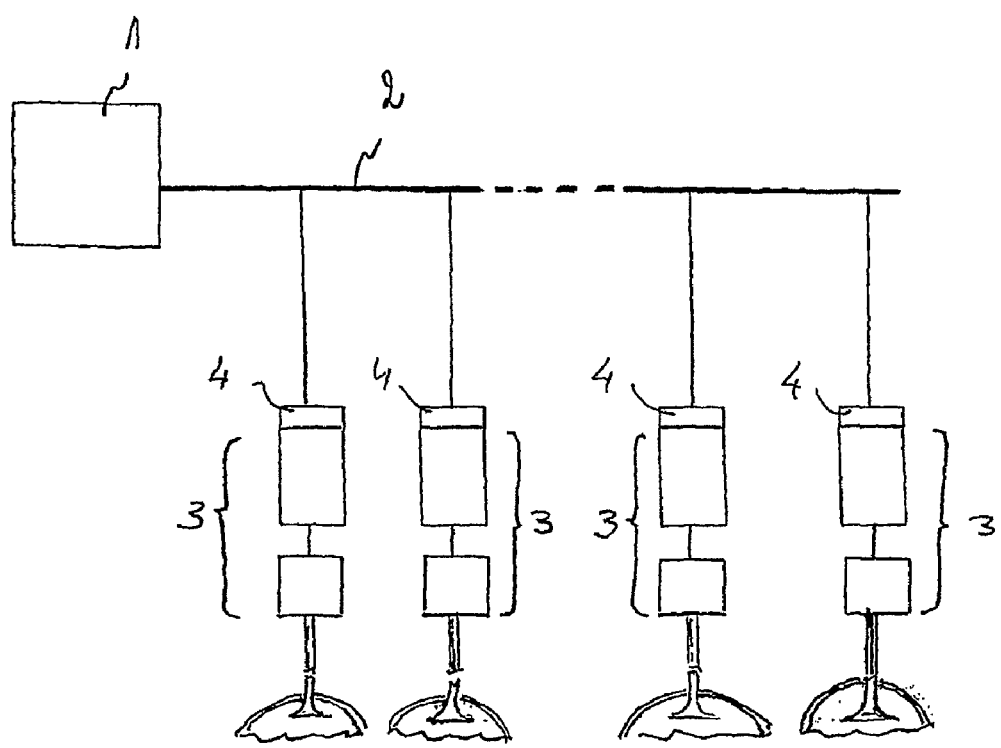

METHOD FOR THE INDIVIDUAL CONTROL OF A SET OF VALVE ACTUATORS BY THE ECU

The present invention relates to a system for controlling a combustion engine with valves such as a motor vehicle four-stroke multicylinder engine.

BACKGROUND OF THE INVENTION

A control system such as this comprises an Engine Control Unit (or ECU) connected by a serial bus to a Valve Control Unit (or VCU) itself connected to electromagnetic valve actuators. The Engine Control Unit is designed to define, particularly as a function of the engine speed and load, valve control instructions that it transmits on the serial bus in a single frame with information relating to engine operation such as engine speed and temperature. The control instructions comprise valve movement modes, valve opening angles and valve closing angles. The Valve Control Unit receives this frame and, on the basis of the control instructions contained in the frame, formulates valve driving instructions that it transmits individually to each valve actuator. The architecture of this system makes it difficult for motor manufacturers to adapt it to suit various types of engine, particularly when the number of cylinders differs from one engine to another, because this then entails reprogramming the Engine Control Unit and changing the Valve Control Unit for a model suited to the number of actuators that need to be controlled. Furthermore, the Valve Control Unit sends back to the Engine Control Unit a single frame containing, on the one hand, information indicating whether or not the control instructions have actually been applied and, on the other hand, information relating to the operation of the Valve Control Unit. With this control system architecture it is difficult to feed back individualized information regarding the operation of the actuators.

SUBJECT OF THE INVENTION

An object of the invention is to propose a system that has relatively good flexibility so that it can be adapted to various engine configurations or various driving methods.

SUMMARY OF THE INVENTION

To this end, the invention provides a system for controlling a combustion engine with valves, comprising an Engine Control Unit and a plurality of valve actuators, in which the Engine Control Unit is connected to a communication bus and the actuators are split into at least two sets each provided with a connection interface for connecting to the communication bus, the Engine Control Unit being designed to define actuator driving instructions and to transmit into the bus, addressed to each set, an individualized frame comprising the driving instructions for the set concerned.

Thus, the actuators are split into several sets directly connected to the communication bus and the Engine Control Unit transmits the driving instructions directly to these sets. The split is a functional one (that is to say preferably logical within the control unit) and has nothing to do with the physical structure of the control system.

For preference, with the combustion engine comprising several cylinders each having at least one valve associated with a valve actuator, each set corresponds to one cylinder. This makes it easier for the control system to be adapted to suit engines with different numbers of cylinders. The intervention required on the Engine Control Unit is restricted to a relatively small programming modification.

The Engine Control Unit, which generally directly drives the injector and the spark plug (in spark ignition engines) which are associated with each cylinder here also drives the actuating set of this cylinder.

For preference, each actuator is designed to transmit, into the bus addressed to the Engine Control Unit, a frame comprising a value of an operating parameter of the actuator.

It is thus possible to feed back to the Engine Control Unit precise information relating to each actuator and, in particular, angles actually applied, operating temperatures, voltages, etc. so that in the event of an anomaly, the Engine Control Unit can decide to disable the defective actuator.

Further features and advantages of the invention will become apparent from reading the description which follows of one nonlimiting particular embodiment of the invention.

BRIEF DESCRIPTION OF THE DRAWINGS

Reference will be made to the single attached FIGURE which schematically depicts a control system according to the invention.

DETAILED DESCRIPTION OF THE INVENTION

With reference to the FIGURE, the control system according to the invention comprises an Engine Control Unit 1 connected to a communication bus, in this instance a serial bus 2, to which valve actuators 3 are connected.

The control unit 1 comprises, in the way known per se, a processor associated with a memory comprising mapped data regarding valve opening and closing angles with respect, in particular, to engine speed and load, valve movement modes (switched or ballistic) etc. The Engine Control Unit is also connected to components for detecting engine speed, engine load, temperature, etc. and to other combustion engine components such as the injectors, the spark plugs, the cooling system, etc.

The bus 2 here is a bus of the CAN (which stands for "controller area network") type.

The actuators 3 comprise, in the way known per se, a control circuit connected to a power circuit itself connected to attraction coils of a valve actuating member that drives the valves into two extreme positions corresponding respectively to the valve open position and the valve closed position.

Each actuator 3 is provided with a connection interface 4 for connection to the bus 2 allowing the actuator control circuit to receive frames transmitted for its attention by the Engine Control Unit 1 and allowing frames to be sent back to the Engine Control Unit 1. Each actuator 3 associated with a connection interface 4 constitutes a set with which the Engine Control Unit 1 communicates.

The Engine Control Unit 1 is thus designed to transmit, for the attention of each actuator 3, frames comprising driving instructions for the actuator 3 over two crankshaft revolutions (these instructions comprise valve opening and closing angles, method of movement, etc.) and information regarding engine operating parameters such as speed, liquid coolant temperature, etc.

The set formed by the control circuit for the actuator 3 and the connection interface 4 is designed such that, on receipt of a frame addressed to it by the Engine Control Unit 1, it extracts the driving instructions from the frame and controls the actuator power circuit in accordance with the driving instructions received and sends back to the Engine Control Unit 1 a frame comprising diagnostic information about the actuator such as the opening and closing angles actually applied, the actuator temperature, the voltage within the actuator, etc. and other information of this type which may, in particular, reveal a malfunctioning of, for example, the actuator.

On receipt of the frames from these sets, the Engine Control Unit 1 analyzes the information received in particular in order to check whether any information item reveals a failure liable ultimately to lead to generalized malfunctioning of the engine. If necessary, the Engine Control Unit 1 may decide to shut down the defective actuator.

Provision may be made for the actuators to be assigned within the Engine Control Unit 1 to groups and for the control unit to shut down all the actuators of a group when one actuator of the group becomes defective. It goes without saying that the fewer actuators there are per group, the less of a penalizing effect the disabling of those actuators will have on engine operation.

For preference, the actuators are grouped together functionally or logically within the Engine Control Unit 1 by cylinder. Each frame sent by the Engine Control Unit 1 thus contains driving instructions and information relating to the actuator or actuators of one cylinder. When there are more than one actuator per cylinder, it is then possible to provide a control circuit common to all the actuators of a cylinder.

When one of the actuators of a cylinder becomes defective, the Engine Control Unit no longer transmits frames addressed to the actuator or actuators of that cylinder. As the combustion engine comprises at least two cylinders it can nonetheless continue to operate at least until the vehicle can reach a repair facility.

Grouping by cylinder also makes the control system easier to adapt to suit engines with different numbers of cylinders.

Of course, the invention is not restricted to the embodiment described and embodiment variants can be made thereto without departing from the scope of the invention as defined by the claims.

In particular, although the invention has been described here in relation to control sets comprising a single actuator, a set such as this may group together two or more actuators, it being understood that it is necessary that there be at least two sets.

The invention claimed is:

1. A system for controlling a combustion engine with valves, comprising:
   an Engine Control Unit; and
   a plurality of valve actuators,
   wherein the Engine Control Unit is connected to a communication bus and the plurality of valve actuators are split into at least two sets, each set provided with a connection interface for connecting to the communication bus, and
   wherein the Engine Control Unit is configured to define actuator driving instructions and to transmit into the communication bus, addressed to each of the at least two sets, an individualized frame comprising the driving instructions for a corresponding set.

2. The system as claimed in claim 1, wherein the combustion engine comprises a plurality of cylinders, each having at least one valve associated with a valve actuator, and wherein each of the at least two sets corresponds to one of the plurality of cylinders.

3. The system as claimed in claim 2, in which each of the at least two sets comprises only one actuator to which the connection interface is connected.

4. The system as claimed in claim 3, in which each actuator is designed to transmit, into the communication bus addressed to the Engine Control Unit, a frame comprising a value of an operating parameter of the actuator.

* * * * *